United States Patent
Smith, Jr. et al.

(10) Patent No.: US 6,962,069 B2
(45) Date of Patent: Nov. 8, 2005

(54) MULTIPLEXED AUTONOMOUS SENSORS AND MONITORING SYSTEM AND ASSOCIATED METHODS

(75) Inventors: Marshall E. Smith, Jr., Eaton, FL (US); Richard W. Stettler, Winter Haven, FL (US)

(73) Assignee: Wolff Controls Corporation, Winter Haven, FL (US)

( * ) Notice: Subject to any disclaimer, the term of this patent is extended or adjusted under 35 U.S.C. 154(b) by 200 days.

(21) Appl. No.: 10/345,842

(22) Filed: Jan. 16, 2003

(65) Prior Publication Data

US 2003/0200784 A1    Oct. 30, 2003

Related U.S. Application Data

(60) Provisional application No. 60/349,876, filed on Jan. 16, 2002.

(51) Int. Cl.[7] ............................................. G01R 15/00
(52) U.S. Cl. ..................................................... 73/1.01
(58) Field of Search .................. 73/1.01, 766, 862.623, 73/708; 324/202; 702/86

(56) References Cited

U.S. PATENT DOCUMENTS 5,479,096 A * 12/1995 Szczyrbak et al. .......... 324/132

* cited by examiner

*Primary Examiner*—Robert Raevis
(74) *Attorney, Agent, or Firm*—Allen, Dyer, Doppelt, Milbrath & Gilchrist, P.A.

(57) ABSTRACT

A sensor monitoring system and associated methods are provide that preferably include a plurality of sensors connected in parallel across a single pair of wires that include resistances of equal value placed in series between each sensor. This allows each sensor to measure the voltage dropped between itself and the monitoring system to determine its relative placement on the bus to autonomously assign itself a number to delineate to the monitoring system its relative location on the equipment or item being monitored. The sensors modulate their internal resistance to change the current on the bus to transmit their status to the monitoring system.

1 Claim, 3 Drawing Sheets

Sensor Block Diagram With Monitor

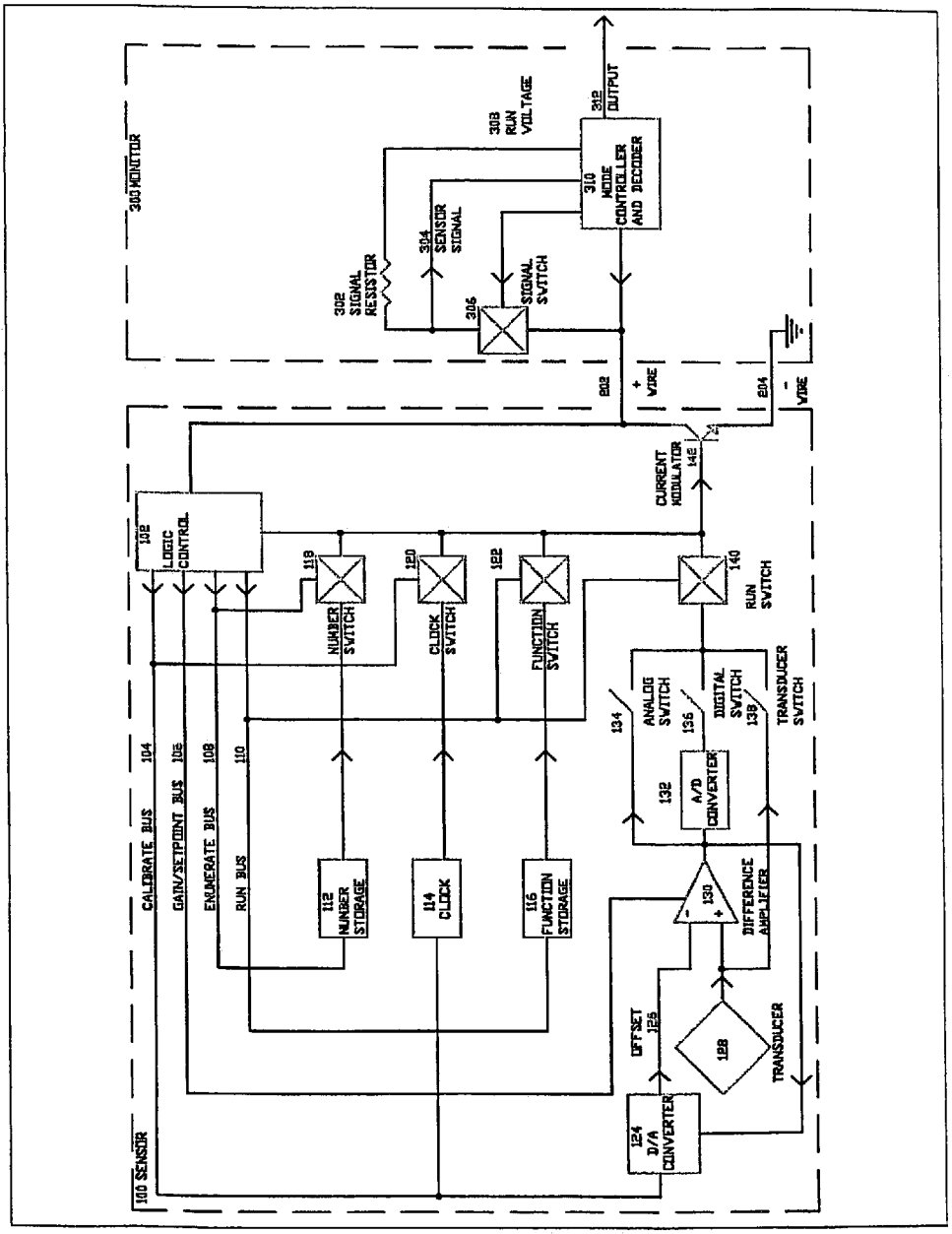
Fig. 1 Sensor Block Diagram With Monitor

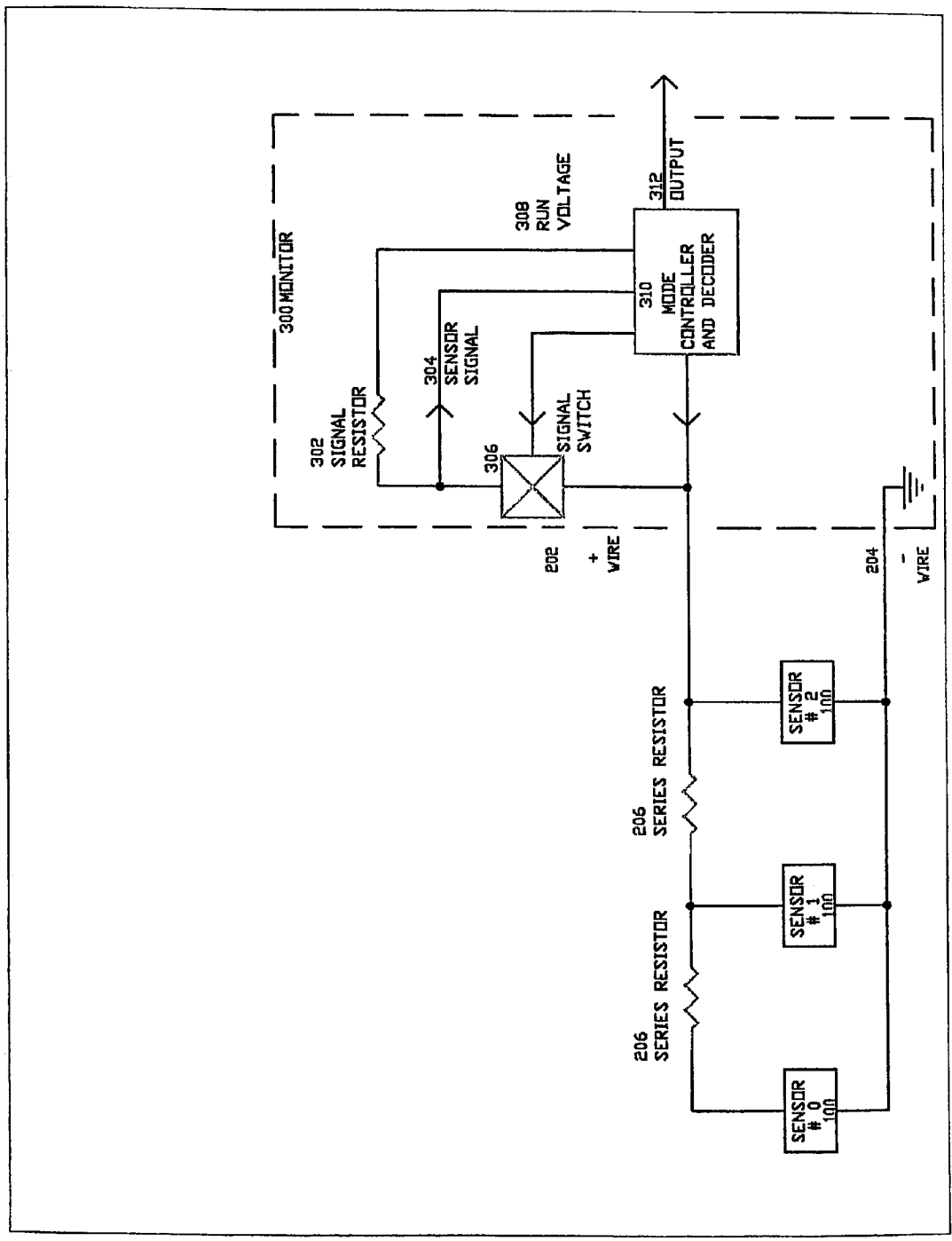
Fig. 2 Multiplexed Sensors and Monitor.

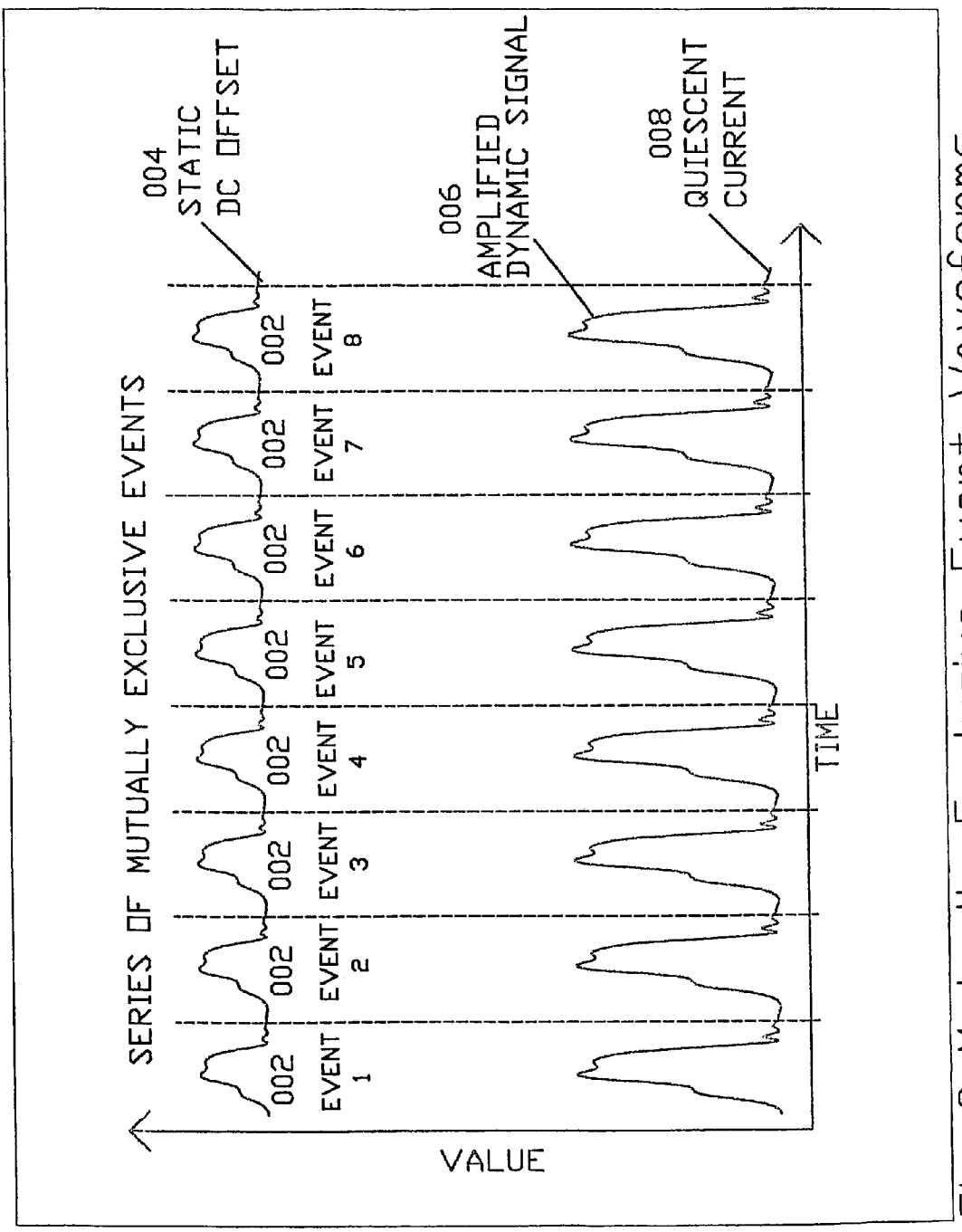
Fig. 3 Mutually Exclusive Event Waveforms

MULTIPLEXED AUTONOMOUS SENSORS AND MONITORING SYSTEM AND ASSOCIATED METHODS

CROSS-REFERENCE TO RELATED APPLICATIONS

This application claims the benefit of U.S. Provisional Application No. 60/349,876, filed Jan. 16, 2002, the disclosure of which is hereby incorporated herein in its entirety by reference.

FIELD OF THE INVENTION

The present invention generally relates to the field of sensor monitoring, and more particularly to a system of interconnecting and monitoring a plurality of sensors with each sensor having autonomous access to a data communication medium independent of other devices.

BACKGROUND OF THE INVENTION

Most machinery or industrial equipment employ sensors for status monitoring or control. Usually, the machinery is relatively complex and more than one sensor is employed to sense more than one parameter, event, or situation. These sensors are connected to monitoring circuits and together or in combination form a sensor monitoring system. Primary goals for these sensing systems are that they be reliable and inexpensive to apply. Some widely used methods of maximizing reliability are to create sensors with the least amount of components to reduce failure rates, the least amount of interconnections possible to reduce wiring faults, and to provide some form of self-diagnostics to determine the sensor's operational status to separate sensor failure from other system problems. Reducing the number of components and the number of interconnections also serves to reduce the overall cost of applying the sensors. Other methods also exist to reduce the application cost while not reducing reliability. A method of reducing sensor application cost while increasing reliability is to connect the sensors in a multiplexing scheme where possible to use a minimum amount of interconnects and external wiring.

Sensors generally have one of three types of outputs: an analog output proportional to the quantity or relative quality of a sensed parameter or to the position of an object or objects, a switched output that is generated when a sensed parameter or the position of an object or objects ranges outside a preset limit, and a digital output that is usually an encoded signal proportional to the analog measurement of the parameter being sensed or to the position of an object or objects. Four possible applications exist wherein more than one of these sensors is applied that determine whether the sensors can be multiplexed and how they can be so connected.

The first application is for machinery that is structured so all the events are either mechanically interconnected or otherwise controlled so that no event that is being monitored occurs at the same time as any other event. This is known as mutually exclusive event monitoring. A primary example of a type of machine that uses this scheme is an internal combustion engine. On most engines up to eight cylinders, the operation of each cylinder is synchronized to all the others through mechanical linkages in a manner such that only one cylinder is generating power at any time. A system monitoring the status of the fuel injectors in the individual cylinders of these engines would be a mutually exclusive event monitoring system. If an event occurs, the monitoring system can use engine timing information such as the rotational position of the crankshaft to determine in which engine cylinder the event is occurring. All sensors can therefore be multiplexed together with no regard to whether any sensor signal will conflict with the signal from another sensor.

A second situation exists wherein the arrangement of machinery is unstructured so any single event can occur at any time regardless of the status of any other event. This situation is known as real-time event monitoring. In real-time event monitoring, there are two situations in which the sensors are applied. A first situation is delineated by whether the events are variable in nature and contain information that must be decoded. Analog or digital sensors monitor these events. A second situation exists where the information desired is whether any one of a plurality of events is simply beyond a preset limit or exceeds a preset parameter. These events are monitored with switched output sensors.

In a first real-time event monitoring situation, the important information about the events being monitored are the actual details about the event itself, for instance, when and how far any single item moves. This is known as discrete event monitoring. A prime example of this system is the monitoring of individual wheel speed sensors on an automotive antilock brake system. In the case of wheel spin or loss of traction, any or all of the individual wheels can have different speeds. The system must know which wheel has a particular speed to adjust the braking force on that wheel only. Each sensor must be monitored separately to determine that particular wheel's speed.

In a second real-time event monitoring situation the sensor monitoring system simply delivers information relating to the status of a collection of events, for instance, whether all items being monitored are in an appropriate or safe position. This is known as one-of-any alarm monitoring. A primary example of this type system is the monitoring of the position of the doors on an automobile. The system delivers an alarm if any door is open. Information about which door is open, or how far it is open, is not needed to generate the alarm condition. These sensors can be multiplexed together, as long as two conditions exist. The first condition is that the alarm signal is not lost if more than one sensor transmits information at the same time. For instance, in the door open alarm situation, if more than one doors is open, the signals from the sensors should add in value and not cancel each other out. A second condition exists when either the particular sensor with the alarm condition is not delineated to the monitoring system, or when the sensor generates some sort of signal so the monitoring system will know specifically which alarm is being generated. It is a common practice in the one-of-any alarm monitoring systems to not delineate the specific location of the alarm but to simply announce that at least one alarm condition exists, in favor of reduced system complexity. The usual alternative to this least expensive monitoring system is to program each sensor with a specific digital signal that identifies the particular sensor generating the alarm. This method, however, requires that the sensors not transmit information simultaneously.

A further method of multiplexing sensors that generate digital signals is to assign each sensor a unique number that delineates the sensor's position and function. This is called a multiplexed digital sensor system. The sensor transmits these numbers along with a number denoting its status either upon a specific event, on regular intervals, or when polled by the sensor monitoring system. There are three methods of assigning unique numbers to each sensor. In the first method, a unique number is assigned during manufacture of the sensor. This is usually accomplished by individually encoding digital numbers into semiconductor material used to generate the sensor circuitry. A second method is to provide a series of switches that the end user programs to individually assign a unique number to each sensor. A third method is to allow the end user to assign a unique number to each sensor by programming methods. Each method is relatively expensive to employ. Assigning a unique number during manufacture requires complex procedures such as vaporizing metal traces with a laser or burning open diode junctions with high voltages. Employing a series of switches or other programming means for the end user to uniquely assign numbers increases the size and complexity of the sensor, increasing cost and reducing reliability. These methods also require that the end user or monitoring system keep track of the numbers assigned so no two sensors have the same number, and so replacement sensor can be assigned the same number as the sensor being replaced.

It is now recognized and addressed by the present invention that an important distinction exists between these four forms of sensor monitoring as it applies to the wiring of the sensors. Sensors used in the least expensive one-of-any alarm monitoring where the particular sensor generating the alarm is not identified, and sensors used in mutually exclusive event monitoring can have analog outputs and can have their outputs connected to the same point electrically because either the events being monitored can only occur independently of each other, or because the information desired is whether any event among a set of possible events is occurring. The determination of which event is occurring can be derived by some other means such as the timing of related events, or the determination of which event is occurring is not as important as the determination of the fact that some specific event is occurring. The discrete event monitoring system and multiplexed digital sensor system cannot use analog signals connected in this simplest multiplexing scheme without some method of insuring that the information delivered by any one sensor is not superimposed over the information delivered by any other sensor. A common practice for these discrete event monitoring systems is to either connect analog outputs separately at the monitoring system, or to digitize the signals and have the sensors transmit the data separately in time so no sensor signal interferes with any other sensor signal.

It is further recognized and addressed by the present invention that a significant problem in sensor systems is that a sensor may itself fail and indicate falsely that either an alarm condition exists or that an event is or is not occurring, regardless of the true status of the system being monitored. It is imperative in some situations that the sensor monitoring system is capable of diagnosing the sensors to determine if a signaled event or problem is due to system problems or simply due to sensor failure. Knowing that a problem is due to simple sensor failure may mean the difference between being able to run the system in a limited mode or having to shut it down, or in operating dangerously when an alarm condition exists that is not being signaled by a broken sensor.

Most prior art position and proximity sensor devices transmit information in one of three ways. Analog position sensors generate an analog signal proportional to a specific parameter being monitored, such as the temperature or the position of one or more objects. Digital proximity sensors generate one or more digital pulses when one or more events occur such as a temperature going above or below a specific set point, or an object moving beyond a specific position. Digital encoder sensors generate digital information concerning the position of an object, the occurrence of an event, or the status of a situation.

Prior art analog position sensors sense the location of objects by sensing the presence of or the relative amount of specific items or materials within their sensing range. Various examples of the technology employed in these sensors are inductive, capacitive, or magnetic sensors. The analog position sensor output is proportional to the position or movement of the object being monitored. These sensors usually rely on the generation of static electromagnetic or magnetic fields and the subsequent dynamic change in the field caused by the movement of the object being monitored. The static fields generated or otherwise used by these sensors are usually at least an order of magnitude larger than the dynamic change in the field caused by the object's movement. These sensors therefore usually transmit large static DC signal offsets and smaller dynamic signals as an object is monitored. This is because there is usually a significantly larger amount of similar nonmoving material in the sensing range of the sensor. For instance, small moving valves are usually surrounded by large rigid housings. This is especially true of magnetic sensors because they usually rely on large, high strength magnets to generate the static field. It is yet further recognized and addressed by the present invention that there is a significant problem is encountered with these sensors if they generate signals using current modulation. The usually quite large static offset signal produces a correspondingly large current, and the dynamic signal as the target moves is usually quite a bit smaller. The large static current causes remote monitoring swamping resistors to drop a large portion of the applied voltage that is used to power the sensor. Also, the monitoring equipment must be capable of ignoring or eliminating the large static offset and amplifying the smaller dynamic signal.

Prior art pulse output proximity sensors generate one or more digital on/off pulses that change state when an object moves between one or more defined positions or moves toward or away from some preset position. These sensors contain output-switching comparators with preset thresholds and hysteresis. Usually, the sensor must be placed in a specific position in relation to the object being sensed to allow the comparators to switch at a point approximately halfway between the extremes of the object's range of movement. It has also been recognized and addressed by the present invention that unless complex compensation circuitry is added to the sensor, the timing of these output pulses in relation to specific object movement can vary significantly from one sensor to the next or from one event to the next because of tolerances in mechanical and electrical components due to changes in electronic devices in the sensor due to aging or temperature changes. A significant advantage is realized in the application of these type sensors if they are produced with the ability to reprogram specific set points independently of the position of the sensor relative to the target.

A problem with the multiplexing of these switched output sensors is that some method must be employed to allow the monitoring system to determine which sensor is in the alarm state if this information is needed. Usually, this is done with each sensor transmitting a digital number delineating its position or function. This greatly complicates the sensor, and requires that each sensor be given a unique number during manufacture or during initial installation.

Prior art digital encoder sensor outputs also cannot transmit at the same time other sensors are transmitting information. This may be ameliorated somewhat if the information is only transmitted after all other sensors have transmitted their information, usually after the event being monitored is occurring. This usually precludes real-time monitoring of these sensors in a multiplexed arrangement. Connecting these sensors to a single interconnection point requires that some method be employed to prevent them from transmitting information at the same time.

It has been found that semiconductor devices such as the three prior art sensors above are usually very susceptible to output changes due to changes in temperature. Temperature changes can change the gain of the analog position sensor and can change the response level and pulse timing of the digital proximity sensor and digital encoder. Also, extreme temperatures can destroy or damage them. Prior art sensor monitoring systems do not usually contain temperature compensation for extreme changes in sensor output as a result of temperature changes nor do they supply any indication that the temperature is above a dangerous level.

Two-wire sensors are connected via two wires and generate signals by modulating the amount of current passing through a remote resistor connected in series between the sensor and a remote monitoring circuit connected to these two wires. The sensor signal is developed into a voltage signal across the resistor. The voltage across the resistor becomes the signal from the sensor. Two-wire technology is less expensive and more reliable than technologies using more wires. Two-wire connection of the three main type of prior art sensors, however, is made difficult by various problems specific to the type of sensor being employed. The smaller dynamic signal must be amplified more to overcome noise. The analog output position sensor's large DC offset through the monitoring resistor wastes power and reduces effective power supply voltage to all sensors. The proximity sensor and digital encoders generate digital pulses that must be transmitted separately from the pulses from any other sensor and some manner of identifying which sensor is generating the information must be employed.

These sensors may be multiplexed, or a multiplicity of sensors can be connected in parallel to the same set of two wires, as long as the following criteria are met:

First, in the case of mutually exclusive event monitoring, mechanical or electrical limitations on the system preclude any of the monitored events from occurring at the same time. In this case we usually know which event should be occurring at any one time and know therefore that the sensor outputting a signal has to be monitoring an event of particular interest. A prime example is the monitoring of the operation of fuel injectors on internal combustion engines. The engine controller or fuel pump may initiate the injections. We know when a particular injection from a particular injector should occur, within a window of time. The sensors can be made very inexpensively because complex circuitry is not required to prevent the sensors from generating conflicting information at the same time. These sensors can generate analog signals, alarm pulses, or digital information without generating a signal at the same time as any other sensor.

Second, the situation may be such that we only want to know that all the sensors are in a particular desired situation. The sensor only transmits information if the situation changes at any one of the monitored stations. It does not matter which sensor has the problem, or that more than one sensor has an alarm situation. This is known as monitoring one-of-any alarms. A prime example is a network of door sensors.

Accordingly, there is a need for a sensor monitoring system that overcomes the limitations of prior art sensors and monitoring systems when monitoring mutually exclusive events or one-of-any alarm conditions.

SUMMARY OF THE INVENTION

With the foregoing in mind, the present invention advantageously provides a sensor or sensor system that overcomes the noise and uncertainty of the digital proximity and encoder sensors. According to the present invention, a specially adapted analog sensor preferably is used to accomplish this. This sensor is modified to eliminate the large DC offset signal and amplify the resultant dynamic signal as much as possible to overcome noise. The quiescent current drawn by the sensor is determined at a known temperature, and compared to the dynamic signal. Any changes in the quiescent current can then be tracked to determine sensor temperature, and to determine and compensate for equal changes in the gain of the dynamic signal gain. For instance, in an application for monitoring engine fuel injectors, the temperature of all components is known before initial start of the engine if the car has not been started for a significant length of time. The current drawn by the sensors is compared to the level of the dynamic signals immediately after the vehicle is started. After the engine is running, changes in the quiescent current indicate consequent changes in temperature. The percentage of change of the quiescent current is then used to modify the gain of the dynamic signal to keep sensor gain constant over its temperature range. A further determination of the temperature of the sensors is possible when the sensors are placed in the calibrate mode. At this time, compensation is provided for the large static offset by subtracting an equal voltage in a differential amplifier. The sensor starts at zero volts and steadily increases the compensation one discrete step at the time until the compensation voltage equals the offset voltage. During this time the sensor transmits a pulse each time its internal clock generates a command to change the compensation voltage. The levels of this clock pulse are preset and change only with temperature. The sensor monitoring system can compare the levels of these pulses during calibration to also determine sensor temperature. These sensors preferably are multiplexed on two wires to reduce wiring cost and complexity.

The present invention advantageously a sensor monitoring system and associated methods are provide that preferably include a plurality of sensors connected in parallel across a single pair of wires that include resistances of equal value placed in series between each sensor. This allows each sensor to measure the voltage dropped between itself and the monitoring system to determine its relative placement on the bus to autonomously assign itself a number to delineate to the monitoring system its relative location on the equipment or item being monitored. The sensors modulate their internal resistance to change the current on the bus to transmit their status to the monitoring system. When the sensor is manufactured, a number may be assigned to the sensor that denotes the sensor's function and is transmitted to the monitoring system when the status of the sensor changes. The sensors monitor the applied voltage that changes as a sensor transmits data to prevent any two sensors from generating signals at the same time. The monitoring system places a specific voltage onto the bus to place the sensors into either an enumeration mode wherein each sensor assigns itself a unique number, or a calibrate mode wherein each sensor determines and adjusts specific information based on its operation and input parameters, or a run mode wherein each sensor monitors its input parameters and transmits information as required. Each sensor draws a specific amount of quiescent current when the enumeration voltage or the calibrate voltage is generated. The enumeration voltage is generated to allow each sensor to determine its relative position on the bus and to assign itself a relative position number. The calibration voltage is generated to allow the sensors to calibrate themselves to eliminate static offset voltages caused by the use of internal or external fields generated to monitor the movement or position of objects. The run voltage is generated to allow the sensors to monitor the output line and transmit information autonomously without any two sensors transmitting at the same time. A series of digital numbers denoting which sensor is to be calibrated may also be transmitted by the sensor monitoring system along with digital numbers setting parameters in the sensor to customize its operation. This would allow it to change specific parameters such as set points for switched outputs, or to set gain or offset levels. During calibration, the sensors draw a specific amount of quiescent current that changes in proportion to the sensor temperature that the monitoring system uses to determine the overall system condition. During the calibration sequence, particular position or proximity sensors may also generate a specific quantity of clock signals corresponding to the level of static offset signal commonly encountered in their application. The number of clock signals convey to the monitoring system the strength of background fields used to generate information in the sensor. The relative strength of the clock pulses convey to the monitoring system the gain of the sensor components and the relative resistance of the interconnections between the sensor and the monitoring system. The monitoring system may also monitor the levels of other digital pulses generated by the sensors to determine the integrity of the interconnection system and to determine the relative position of the sensor transmitting the information. A lowest voltage is generated to place the sensors in a run mode to allow them to monitor their respective functions and to transmit information to the monitoring system. Voltages higher in value than the run voltage are generated by the monitoring system as digital codes to set various sensor parameters such as gain and switching set points. The sensors transmit their data as increases in current. This serves to cause the voltage to drop as the data is being transmitted. This drop in voltage below the run level inhibits the other sensors from also transmitting data until the run voltage returns to its normal level. The relative current drawn by the system and the relative voltage level of these digital pulses will be changed as the resistance of interconnects changes.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is a schematic block diagram of a sensor having a monitor according to the present invention;

FIG. 2 is a schematic block diagram of a sensor system having a monitor according to the present invention; and FIG. 3 is a graph of value versus time of mutually exclusive event waveforms of a sensor system according to the present invention.

DETAILED DESCRIPTION OF THE PREFERRED EMBODIMENTS

The present invention will now be described more fully hereinafter with reference to the accompanying drawings that illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

As shown in FIGS. 1–3, preferred embodiments may include a sensor monitoring system and sensors that connect via a two-wire multiplexed system. Provision is made to allow the sensors to assign themselves unique numbers based on their relative position on this bus. Provision is also made to preclude any sensor from transmitting data while any other sensor is already transmitting. Sensors may have analog outputs, switched outputs, or digital pulse train outputs. Position sensors or other sensors with large static DC offset signals have provisions to eliminate the large static DC signal and amplify the dynamic event signal. The sensor monitoring system also monitors the relative signal levels of the sensors and transmits a diagnostic signal if they fall out of a specified range. Various sensors with large static DC offset signals and relatively small dynamic output signals are also conditioned to reduce the offset and amplify the dynamic portion of the signal to improve efficiency and reduce noise.

Sensor/Monitor Operation Procedure

Initial Power-Up:

Monitor goes into sensor count mode, sets power supply voltage high enough to place first sensor in enumerate mode (7 VDC). First sensor shuts off its output, monitor senses decrease in current, counts first sensor.

Monitor continues to steadily ramp up power supply voltage. Voltage increases to a level necessary to put next sensor into enumerate mode (7.1 VDC)

Next sensor shuts off output, monitor senses decrease in current, counts next sensor.

Procedure repeats from step 3 till no change in current occurs.

The monitor records the number of sensors; if the number of sensors is same as last power-up, procedure is ended.

If the number of sensors is less than at the last power-up, the monitor generates an alarm. Operator repairs bad or missing sensor or resets the monitor alarm if a sensor has been removed. Procedure is repeated from step 1.

If number of sensors is more than last power-up, monitor records new number and shuts off power to reset the sensors.

Monitor sets power supply output high enough to place all sensors in enumerate mode.

(7 VDC+(0.1*(# of sensors minus one)).

After brief period, all sensors enumerate and set their calibrate and run voltages to compensate for voltage drops across their respective series resistors.

(Sensor calibrate is 6 VDC+(0.1*sensor #)

(Sensor run is 5 VDC+(0.1*sensor #)

Calibrate Mode for Position Sensors with Large Offset Only:

Monitor sets power supply to calibrate voltage level of first sensor in line.

First sensor begins a calibration; offset goes to zero as clock pulses are transmitted.

All other sensors sense drop in voltage as first sensor transmits; sensors place themselves in hold mode.

Monitor counts clock pulses and stores total number.

When output is zeroed, sensor clock output stops decreasing and varies above and below a fixed point.

Monitor stores total number of clock pulses.

Monitor compares present level to previously stored level, if present.

If present level significantly different from previous level, monitor generates an alarm.

Monitor increases calibrate voltage to level needed to calibrate next sensor.

Next sensor begins calibration, offset goes to zero as clock pulses are transmitted Repeat from step 3 until last sensor reached.

Run Mode:

Monitor to run mode, voltage to 5 VDC+(0.1 VDC*# of sensors minus one)

Monitor determines initial system temperature if available monitor compares sensor output pulses or quiescent current to values taken at a known temperature, stores value.

Monitor generates an alarm if sensor output indicates extreme temperature.

Repeat steps 1 through 4 as needed.

Sensors generate data by modulating the current. As the current increases through the signal resistor, the supply voltage goes down. Each other sensor is inhibited until the bus voltage returns to the run level for a short period of time.

Set Point/Gain Set Mode:

Monitor generates sensor number and set points or gain information digitally by increasing the voltage. Sensors know that monitor is transmitting information because voltage is increasing above run level. All sensor outputs shut off until bus returns to run level.

FIG. 1 schematically illustrates a complete monitoring system with a monitor 300 and a single sensor 100. A series of sensors 100 are shown connected through series resistors 206 to monitor 300 in FIG. 2. Monitor 300 supplies power to sensors 100 through two wires, positive wire 202 and negative wire 204. Sensors 100 transmit their output signal by controlling the resistance of current modulator 142. This current modulation is transformed into a voltage sensor signal 304 in monitor 300 when it passes through signal resistor 302. This signal is then processed as needed by mode controller and decoder 310 and transmitted to external equipment through output 312.

Sensor 100 contains a logic control 102 that senses the applied voltage and selects functions based on the levels of these voltages. Monitor 300 generates commands and sets a mode for the sensor 100 by increasing the voltage level on the sensor 100 input above a nominal value which is run voltage 308. Sensors 100 generate information and transmit signals by increasing the current through current modulator 142, resulting in voltages lower in value than run voltage 308. In this manner, logic control 102 determines that information is coming from monitor 300 when the voltage increases in value, and that information is coming from another sensor 100 connected to the bus when the voltage decreases in value. Monitor 300 selects one of four functions by modulating the voltage level between positive wire 202 and negative wire 204. When monitor 300 enters the enumerate mode, it generates a steadily increasing voltage across the bus. Logic control 102 compares the voltage generated by monitor 300 to an internal reference. When this voltage goes higher than a threshold voltage required to place it in the enumerate mode, it opens run switch 140 to remove any signal from the bus. Monitor 300 determines when this occurs as the current decreases in value and then steps up the voltage by a discrete amount and again waits for the current to drop. If there are other sensors 100 attached to the bus they will likewise turn off their output and lower the bus current resulting in increasing sensor signal 304. This procedure will be repeated until no more current drops are sensed. The monitor counts each current drop and therefore knows how many sensors 100 are connected to the bus. Monitor 300 then removes all power from the bus for a short period of time to reset all the sensors 100. It then applies a voltage on the bus that is high enough in value to place all sensors 100 into the enumerate mode through all the series resistors 206. For example, assume the voltage required to place the sensors in the enumerate mode is 7 Volts DC, and that each series resistor drops 0.1 Volt. Monitor 300 first places 7 Volts on the bus. The sensor connected to the first position on the bus closest to monitor 300 has no series resistance, so it receives this 7 Volts and goes into the enumerate mode. It drops its current and monitor 300 senses this. Monitor 300 then changes the voltage to 7.1 Volts. The second sensor in line then receives 7 Volts and goes into the enumerate mode. This process repeats until the last sensor 100 is reached at which time the current no longer decreases and the monitor 300 then knows how many sensors 100 are connected to the bus. Monitor 300 then adjusts the enumerate voltage to the appropriate value needed to enumerate the last sensor 100 on the bus, and the sensors 100 then sense their applied value and enumerate themselves based on this value. Logic control 102 does this by generating the sensor number onto enumerate bus 108 and thereby placing it in number storage 112 after sensor voltage has remained steady for a significant length of time.

After the enumeration process is completed, monitor 300 then places the sensors 100 into the calibrate mode by decreasing the applied voltage on the bus to an intermediate level.

In FIG. 3, there is shown a typical set of waveforms for position sensors using static electromagnetic fields for operation. The static electromagnetic field generates a static DC offset 004 shown along with a dynamic event 002. Both signals are shown in relation to their relative values. Note that the dynamic event 002 is much smaller in value than the static DC offset 004. Below these waveforms is shown a desired sensor output signal. Note that now the event 002 has been converted into an amplified dynamic signal 006 and that the static DC offset 004 has been reduced to a very low value quiescent current 008.

The events 002 shown are a series of mutually exclusive events 002 with the same offset and resultant signal conditioning. Note that none of the events occur at the same time.

An additional temperature diagnostic capability is realized when the sensors 100 are in the run mode if the temperature of the system is known at some point in time. The relative levels of signals from the sensors 100 can be programmed to increase in direct proportion to the temperature of the sensor. Monitor 300 can sense these changes and generate an alarm if a signal level increase indicates that the temperature of the system or of the sensors is rising beyond a specific level. By the same manner, interconnect problems for the sensor 100 or with series resistors 206 will cause sensor 100 signal levels to decline. Monitor 300 can also generate an alarm if these signals fall below a specific level.

This concludes the teaching of the preferred embodiments. Note however that in many different situations wherein specific types of sensors may be connected in this system, various simplifications of the preferred embodiments may be realized to reduce complexity and cost and improve reliability. For instance, if a system of similar sensors 100 is utilized in a system consisting only of mutually exclusive events, specific functions such as enumeration and function identification do not have to be performed. The monitoring system will know which event is occurring in time, and the functions will all be the same. Likewise, monitoring of the clock output during the calibrate phase would not have to be performed, as long as the sensors output is monitored for changes in level to perform diagnostic checking. Similarly, systems using one-of-any alarm sensors would also not require enumeration or function identification. The monitoring system would know from the relative pulse levels how many series resistors the signal passes through from the corresponding level of these pulses.

It should also be noted that all the features of the preferred embodiments may be applied to sensor monitoring equipment connected to single sensors with more than two wires. For instance, sensors that deliver information continuously could be connected with a third wire for a voltage output without substantially deviating from the preferred embodiment by simply connecting the current modulator to a third wire and using it as a voltage generator. Sensor enumeration would not be required in this situation, and diagnostics could be performed without the additional series resistors by simply monitoring the output level.

As described above and as illustrated in FIGS. 1–3, the present invention advantageously provides a multiplexed two-wire sensor and sensor monitoring system for any number or combination of sensors, autonomously enumerated sensors, and a sensor monitoring system. The present invention also advantageously provides a sensor and monitoring system with sensor function identification, a p-Position sensor and monitoring system with output offset reduction for reduced power and reduced noise, a position sensor and monitoring system with output offset reduction with counted clock pulses output for electromagnetic field diagnostics, and a one-of-any alarm sensor and monitoring system with alarm position detection.

The present invention additionally advantageously provides a mutually exclusive event sensor and monitoring system with two-wire connection, a sensor and monitoring system with remote gain, set point, or other calibration setting, a sensor and monitoring system with sensor temperature monitoring and alarm, a sensor and monitoring system with output queuing system based on sensing of lowered voltages as another sensor transmits, and a sensor and monitoring system with sensor position detection based on voltage dropped across series resistors as the sensor transmits pulses or switched outputs.

The present invention still also advantageously provides a sensor monitoring system with sensor interconnect diagnostics based on voltage dropped across bad connections, a sensor monitoring system with sensor output level diagnostics to detect failing sensors based on voltage dropped across series resistors, a sensor monitoring system with multiplexed analog, switched level, and digital pulse output sensors, a sensor monitoring system with multiplexed sensors that generate a quiescent output when placed in enumeration mode for determination of the number of sensors connected to the bus, a sensor monitoring system utilizing increased voltage levels to place the sensors in various modes of operation, and a sensor monitoring system utilizing decreased voltage levels to prevent any two sensors from transmitting at the same time.

In the drawings and specification, there have been disclosed preferred embodiments of the invention, and although specific terms are employed, the terms are used in a descriptive sense only and not for purposes of limitation. Further, it is understood that that various modifications and changes may be made within the spirit and scope of the invention without departing from the spirit and scope of the present invention as set forth in the appended claims.

That which is claimed is:

1. A method of monitoring an electronic sensor for providing a corrected dynamic signal, the method comprising:
    measuring a first quiescent current drawn by a sensor positioned within an environment having a first temperature;
    measuring a second quiescent current drawn by the sensor at a second temperature;
    comparing the first and second quiescent currents and determining a percentage change therebetween;
    measuring a dynamic signal from the sensor during operation of the sensor at the second temperature; and
    modifying the dynamic signal by the percentage change of the first and second quiescent currents for providing a corrected dynamic signal.

* * * * *